(12) United States Patent
Herger et al.

(10) Patent No.: US 9,262,747 B2
(45) Date of Patent: *Feb. 16, 2016

(54) TRACKING PARTICIPATION IN A SHARED MEDIA SESSION

(71) Applicant: International Business Machines Corporation, Armonk, NY (US)

(72) Inventors: Lorraine M. Herger, Port Chester, NY (US); Neal M. Keller, Pleasantville, NY (US); Matthew A. McCarthy, Holly Springs, NC (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 54 days.

This patent is subject to a terminal disclaimer.

(21) Appl. No.: 13/958,643

(22) Filed: Aug. 5, 2013

(65) Prior Publication Data

US 2014/0160224 A1    Jun. 12, 2014

Related U.S. Application Data

(63) Continuation of application No. 13/707,597, filed on Dec. 7, 2012.

(51) Int. Cl.
| | |
|---|---|
| *G06F 15/16* | (2006.01) |
| *G06Q 10/10* | (2012.01) |
| *H04L 29/06* | (2006.01) |
| *H04N 7/15* | (2006.01) |
| *H04L 12/18* | (2006.01) |
| *H04M 3/56* | (2006.01) |
| *G06F 12/00* | (2006.01) |

(52) U.S. Cl.
CPC ............ *G06Q 10/10* (2013.01); *H04L 12/1822* (2013.01); *H04L 12/1831* (2013.01); *H04L 29/06* (2013.01); *H04M 3/567* (2013.01); *H04N 7/15* (2013.01); *H04N 7/155* (2013.01); *H04N 7/157* (2013.01)

(58) Field of Classification Search
CPC .......................... H04L 29/06176; H04L 12/58
USPC .......................... 709/204–207, 223–229, 250
See application file for complete search history.

(56) References Cited

U.S. PATENT DOCUMENTS

| | | | |
|---|---|---|---|
| 7,099,448 B1 | 8/2006 | Laniepce | 379/202.01 |
| 7,768,543 B2 | 8/2010 | Christiansen | 348/14.08 |
| 8,175,244 B1 | 5/2012 | Frankel | 379/202.01 |
| 2003/0125954 A1 | 7/2003 | Bradley | 704/270 |
| 2004/0141605 A1 | 7/2004 | Chen | 379/202.01 |
| 2005/0018828 A1* | 1/2005 | Nierhaus et al. | 379/202.01 |
| 2005/0063522 A1* | 3/2005 | Kim et al. | 379/88.02 |
| 2005/0135583 A1 | 6/2005 | Kardos | 379/142.01 |
| 2007/0260684 A1 | 11/2007 | Sharma et al. | 709/204 |

(Continued)

*Primary Examiner* — Zarni Maung
(74) *Attorney, Agent, or Firm* — Ido Tuchman; Louis J. Percello

(57) ABSTRACT

A system, method, and computer program product for tracking user participation in a shared media session. A shared media session is connected to, where the shared media session includes a plurality of participants. A first identity is determined for a first participant with a first confidence level. The first participant is identified as the first identity if the first confidence level is above a first threshold. An amount of participation is tracked for the first identity. The amount of participation by the first identity is displayed on an electronic calendar for the shared media session to the plurality of participants.

18 Claims, 13 Drawing Sheets

(56) References Cited

U.S. PATENT DOCUMENTS

| | | | |
|---|---|---|---|
| 2007/0300164 A1* | 12/2007 | Bhogal et al. | 715/753 |
| 2008/0262910 A1 | 10/2008 | Altberg | 705/14.69 |
| 2009/0254843 A1 | 10/2009 | Van Wie | 715/757 |
| 2010/0145801 A1 | 6/2010 | Chekuri | 705/14.51 |
| 2011/0096135 A1 | 4/2011 | Hegde et al. | 348/14.07 |
| 2011/0134910 A1* | 6/2011 | Chao-Suren et al. | 370/352 |
| 2011/0202439 A1 | 8/2011 | Ricci | 705/32 |
| 2011/0225013 A1* | 9/2011 | Chavez et al. | 705/7.18 |
| 2012/0002798 A1* | 1/2012 | Chen et al. | 379/203.01 |
| 2012/0196660 A1 | 8/2012 | El Dokor | 463/8 |
| 2013/0091205 A1* | 4/2013 | Kotler et al. | 709/204 |

* cited by examiner

TRACKING PARTICIPATION IN A SHARED MEDIA SESSION

CROSS-REFERENCE TO RELATED APPLICATIONS

This application claims priority under 35 U.S.C. §120 to U.S. patent application Ser. No. 13/707,597 filed Dec. 7, 2012, the entire text of which is specifically incorporated by reference herein.

BACKGROUND

The present invention relates to tracking user participation in a shared media session. Meetings between employees, partners, or any individuals working together are an important component to any successful business organization. As such, tracking the behavior of individuals during such meetings has become increasingly important.

In large corporations, employees can spend much of their day on conference calls or in other types of media inspired meetings. As such, it would be beneficial to determine which meetings hold high value for a given employee, or for the corporation as a whole.

BRIEF SUMMARY

One example of the present invention is a method for tracking user participation in a shared media session. The method includes a connecting step for connecting to a shared media session. The shared media session may include a plurality of participants. A determining step determines a first identity for a first participant, with the first identity determined with a first confidence level. An identifying step identifies the first participant as the first identity if the first confidence level is above a first threshold. A tracking step tracks an amount of participation by the first identity. A displaying step displays on an electronic calendar for the shared media session the amount of participation by the first identity to the plurality of participants.

Another example of the present invention is a system for tracking user participation in a shared media session. The system includes a computer that further includes a computer processor. The computer is configured to connect to a shared media session, with the shared media session including a plurality of participants. The server is further configured to determine a first identity for a first participant. The first identity is determined with a first confidence level. The server is also configured to identify the first participant as the first identity if the first confidence level is above a first threshold. The server is further configured to track an amount of participation by the first identity. The server is additionally configured to display on an electronic calendar for the shared media session the amount of participation by the first identity to the plurality of participants.

Yet another example of the present invention is a computer program product for tracking participation in a shared media session. The computer program product includes computer readable program code configured to: connect to a shared media session of a plurality of participants; determine a first identity for a first participant with a first confidence level; identify the first participant as the first identity if the first confidence level is above a first threshold; track an amount of participation by the first identity; and display on an electronic calendar for the shared media session the amount of participation by the first identity to the plurality of participants.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
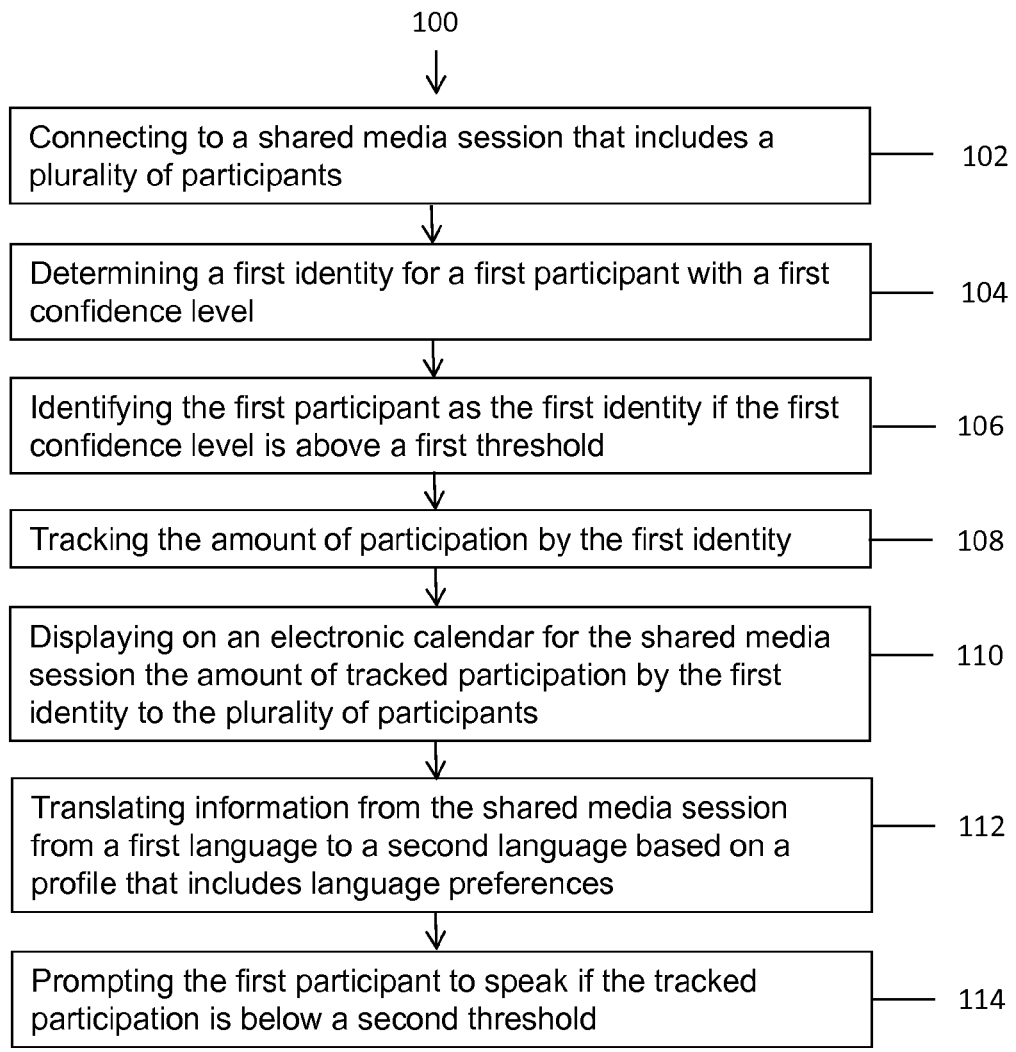
FIG. 1 shows a method for tracking participation in a shared media session according to one embodiment of the present invention.

The present invention is described with reference to embodiments of the invention. Throughout the description of the invention reference is made to FIGS. 1-13. When referring to the figures, like structures and elements shown throughout are indicated with like reference numerals.

Often, participants of an electronic meeting, e.g., meeting held by phone, are interested in who participated in the particular meeting. An embodiment of the invention includes a system and method in which a voice recognition module (VRM) analyzes the callers' voices, and when the meeting has ended, the system shows a graphical indication of the amount of time each participant spoke during the meeting to the participants, e.g., in the form of a bar chart. In an example, the system places the depicted amount of time on a calendar entry for that meeting. This is useful because it provides a record of meeting participation. Additionally, such graphical indications may be updated in real-time during the meeting. In an embodiment, the voice recognition process is made more accurate and efficient by using meeting participant information as identified on a typical calendar entry for a meeting.

Electronic meetings are now taking place using a phone, video-conference, or virtual universe. These meetings are often scheduled using an electronic calendar. One drawback of such electronic meetings is that meeting attendees are often unsure during the meeting, and after a meeting has concluded, the degree to which each participant has participated. An embodiment of the invention disclosed here is labeling of an electronic calendar with metadata representing a recognized person participating in an electronic meeting by his or her voice.

For example, a person may be identified by voice when he or she is speaking. The identification may be made, in part, by comparing speech waveforms that are monitored during the call. Voice recognition is then used to identify a person with a certain confidence level L. Thus, not only is the calendar changed as a result of the determined speaker participation information, the calendar also provides restricting information to enhance the accuracy of the VRM.

In an embodiment, the voice recognition process is made more accurate and efficient by using meeting participant, also known as attendee, information as identified on a typical calendar entry for a meeting. For example, the names of ten potential meeting participants may appear on a meeting entry in a calendar. In an embodiment, they system estimates a country of origin, and hence a possible accent or use of words, from the email addresses of some meeting participants. By way of example, a voice-recognition module identifies a particular speaker with a certain confidence level by comparing the voice waveform of a speaker with known waveforms in a database. In an embodiment, the comparison can be performed with greater efficiency if the module can focus on the ten possible speakers identified on a calendar entry as opposed to, for example, thousands of possible speakers. Also, the use of meeting-attendee information may aid speaker identification in the presence of noise, e.g., if the participant is using a cell phone in an airport.

In an embodiment, once a speaker is identified, the system may display, to the participants, information related to: 1) the amount of participation of each participant, e.g. a bar chart that changes in real-time and finally becomes static once the meeting has finished, 2) a real-time trace of participation through time during a meeting, 3) the amount of time one speaker has interrupted another speaker, and any other suitable information that can be determined from the tracked participation. The system may also display information regarding unidentified speakers.

In an embodiment, a Voice-Recognition Module (VRM) monitors voices in an electronic meeting. The VRM identifies possible speakers with confidence level L. Confidence level L is increased with reference to names of attendees on an attendee list associated with meeting, i.e., confidence level L is increased by enhancing voice recognition process using restricting information provided by, for example, meeting attended information on a calendar.

In an embodiment, if Confidence level L exceeds threshold T participation information is displayed to the participants. For example, a Calendar entry for the meeting is updated with information related to participation of each speaker.

In an embodiment, the amount of speaker participation for each speaker is used to automatically affect the invitation list for future meetings. This may be particularly useful in scenarios in which a "cost" is associated with meeting participation. Such costs include: a computational cost of rendering numerous avatars in a virtual-universe meetings, the cost of phone connections, the cost associated with a decrease in security as the number of attendees escalates, etc. In other words, if the cost is high, it may be advantageous in some scenarios to limit future attendees to the same or similar meetings to those attendees who participate the most.

In an example, information on those speakers who have spoken the most may be used for automatically spawning new meetings with these highly vocal speakers. In an embodiment, the system may be used to automatically prompt those attendees who have not spoken or have spoken very little. In an example, the system may be used to offer participation assistance such as real-time language translation to those appropriate attendees who have not spoken or have spoken very little. The system may also be used by a meeting moderator, or by an artificial-intelligence agent, to privately remind those speakers who are dominating the conversation or interrupting others to allow others to talk.

In an embodiment, the system may be used to annotate meeting recordings with the name of the current speaker, or may be used to enable skipping through a meeting recording to listen to all contributions from a given speaker and to optionally focus on a particular period of time when, for example, the system detects lively back-and-forth chatter or other characteristics.

In an embodiment, a high-level calendar view, e.g., a month at a glance may indicate any of: 1) those meetings that had the greatest number of different speakers participating in a meeting, as indicated by voice identification, 2) those meetings that had the least participation, 3) the ratio of number of participators to the number of attendees, etc. For example, if the ratio corresponds to value greater than 70%, the calendar entry may be shaded green.

In an embodiment, the rate of change of speaker participation from meeting to meeting may be tracked. For example, consider ten meetings held through the months on a particular topic with the same attendees or nearly the same attendees. A particular speaker may speak very little at the first meeting, more at the second meeting as he or she gains confidence or becomes more familiar with the subject under discussion, etc. This "rate of change" in participation may be tracked and indicated.

In an embodiment, the constancy of inner milieu (CIM) may be tracked to indicate the constancy of speaker, e.g. a single attendee speaking for a contiguous length of time with no one else speaking, the occurrence and rate of speaker changing, and the amount of various forms of back-and-forth chatter. For example, if one speaker is speaking for ten minutes with no interruption, CIM is high. If, on average, every seven seconds for a period of two minutes, the speaker changes, CIM is low. CIM may be indicated in various ways on a calendar entry, including through the use of coloration.

In an embodiment, in a virtual universe setting and based on a meeting type, the system may employ Stopper avatars to stop or decrease the speaking of the speaker who has spoken for too long a time, to allow other attendees an opportunity to engage in dialog, brainstorming, providing opinions, etc. In an embodiment, the virtual universe controller may increase or decrease the size of a meeting room in response to a computation of CIM so as to foster participation of more attendees. For example, if CIM is high in a huge virtual conference room, the system may decrease the size of the room to encourage participation and interaction. In order to encourage more participation, the speaker who is monopolizing the conversation in a meeting designated as a brainstorming session may decrease in size so as to encourage the speaker to allow others to speak. In an example, when the size decreases below a threshold size, the avatar is represented as a tiny, immobile statue that is devoid of body motions, mouth motions, coloration, etc., so as to encourage others to speak.

In an embodiment, depending on the value of CIM, an automated meeting switcher (MS) may switch the meeting from a phone meeting to a virtual universe (VU) meeting, and vice versa. For example, if few participants are interacting on a phone call for an invention brainstorming session, the MS may switch the meeting to a VU, where each potential participant is represented by an avatar, the graphical attributes of which may indicate the degree of participation of that avatar in a meeting.

Note that, in some cases, the nature of the communications channel may be an inhibitor for rapid participant interaction. As an example, a half-duplex (HDX) system provides communication in both directions of a call, but only one direction at a time. Typically, once a participant begins receiving a signal, the participant must wait for the transmitter to stop transmitting, before replying. Other kinds of communications inhibitors exist, such as noisy lines, improper echo cancellation, etc., associated with the communication link. In an embodiment, the system disclosed herein may automatically detect a possible inhibitor associated with a communications channel and automatically allow such a participant an increased opportunity for participating. This amelioration action may take many forms. For example, the system may optionally increase the size of an avatar, interrupt a meeting to allow a participant additional time to interject, change a meeting from a teleconference to a virtual universe setting, etc.

In an embodiment, each participant may setup a unique Voice Signature ID (VSID) in the system. The conference audio is analyzed, for instance, in real-time, for unique participant voice patterns that map to VSIDs. By way of example, the conference audio is recorded and transcribed with embedded VSID markers throughout. In an embodiment, the moderator can search the audio record for input by VSID and playback or capture, or additionally search transcribed text for input by VSID and capture. In an example, the conference audio file and transcribed text are saved with mapped VSIDs for reference. In an embodiment, the master audio and text files are accessible to participants for historical reference.

FIG. 1 shows a method for tracking participation in a shared media session according to one embodiment of the present invention. The method includes a connecting step 102. During the connecting step 102, a shared media session is connected to, where the shared media session includes a plurality of participants. By way of example, the participants may comprise telephone callers on a conference call, participants in a video conference, or participants represented by avatars in a virtual universe. After the connecting step 102 is completed, the method continues to determining step 104.

At determining step 104, a first identity is determined for a first participant with a first confidence level. After the determining step 104 is completed, the method continues to identifying step 106. At identifying step 106, the first participant is identified as the first identity if the first confidence level is above a first threshold. After the identifying step 106 is completed, the method continues to tracking step 108.

At tracking step 108, an amount of participation by the first identity is tracked. By way of example, if the shared media session comprises a teleconference, the amount the first identity speaks during the teleconference is tracked. After the tracking step 108 is completed, the method continues to displaying step 110. At displaying step 110, the amount of participation by the first identity is displayed on an electronic calendar for the shared media session to the plurality of participants. After the displaying step 110 is completed, the method continues to translating step 112.

At translating step 112, information from the shared media session is translated from a first language to a second language. By way of example, the translation occurs based on a profile that specifies a language preference for the first identity. The translation may also be enacted based on a low level of participation from the first identity.

In an embodiment, a profile for the first identity specifies a language preference. In an example, speech spoken in a first language during a shared media session is translated to a second language where the second language is specified based on the language preference for the first participant. In another example, information displayed on a shared screen, such as a presentation displayed to multiple participants over a WebEx session, is translated based on the language preference for the first participant.

In an embodiment, language translation may be triggered by a low level of participation, such as participation below a specified threshold, by the first participant. After translating step 112, the method continues to prompting step 114. At prompting step 114, the first participant is prompted to speak if the tracked amount of participation for the first participant is below a second threshold.

Figure 2:
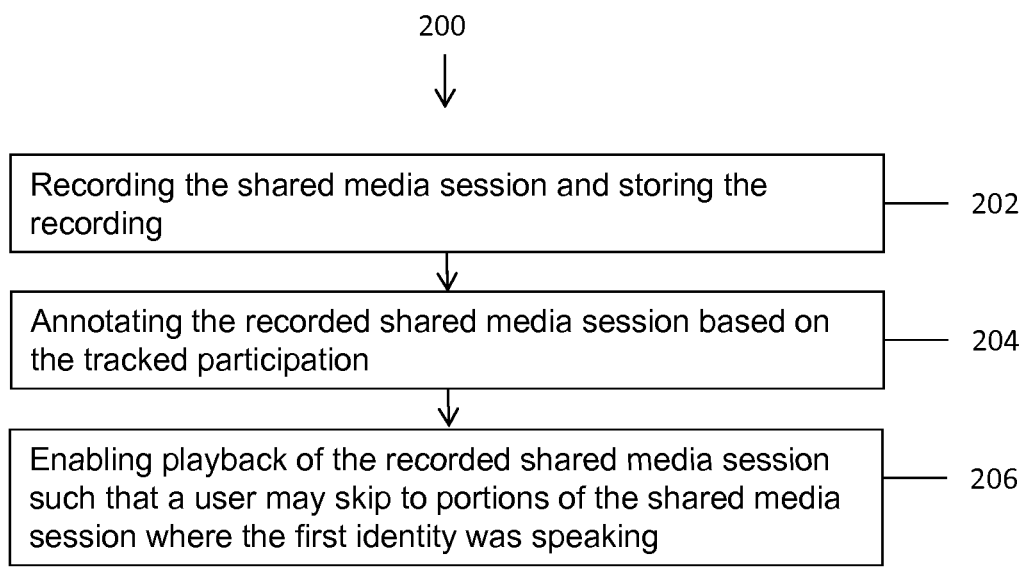
FIG. 2 shows a method for recording and storing a shared media session according to one embodiment of the invention.

FIG. 2 shows a method for recording and storing a shared media session according to one embodiment of the invention. The method of FIG. 2 may be implemented in connection with the method of FIG. 1. At recording step 202, the shared media session is recorded and stored. After recording step 202, the method continues to annotating step 204. At annotating step 204, the recorded shared media session is annotated based on the tracked participation for the first identity. After annotating step 204, the method continues to playback step 206. At playback step 206, playback is enabled for a user such that the user may skip to portions of the shared media session where the first identity was speaking.

Figure 3:
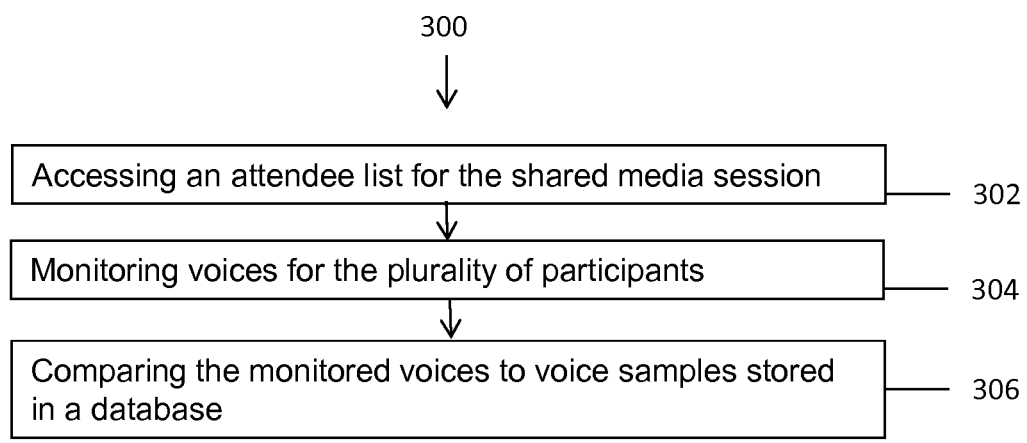
FIG. 3 shows a method for determining an identity for a participant according to one embodiment of the present invention.

FIG. 3 shows a method for determining an identity for a participant according to one embodiment of the present invention. The method of FIG. 3 may be implemented in connection with the method of FIG. 1. For example, determining step 104 may further comprise the method steps of FIG. 3.

The method of FIG. 3 includes an accessing step 302. At accessing step 302, an attendee list is accessed for the shared media session in the electronic calendar. In an embodiment, a first identity is determined based on the accessed attendee list. For example, an attendee list of a calendar entry for the shared media session is used to restrict voice samples stored in a database to only the stored voices of the attendees to determine an individual identification. Thus, speaker identification confidence can be improved, for example, in a noisy environment with overlapping speech. After accessing step 302 is completed, the method continues to monitoring step 304. At monitoring step 304, voices for the plurality of participants are monitored. After monitoring step 304 is completed, the method continues to comparing step 306. At comparing step 306, the monitored voices are compared to voice samples stored in a database. In an embodiment, a first identity is determined based on the comparison.

Figure 4:
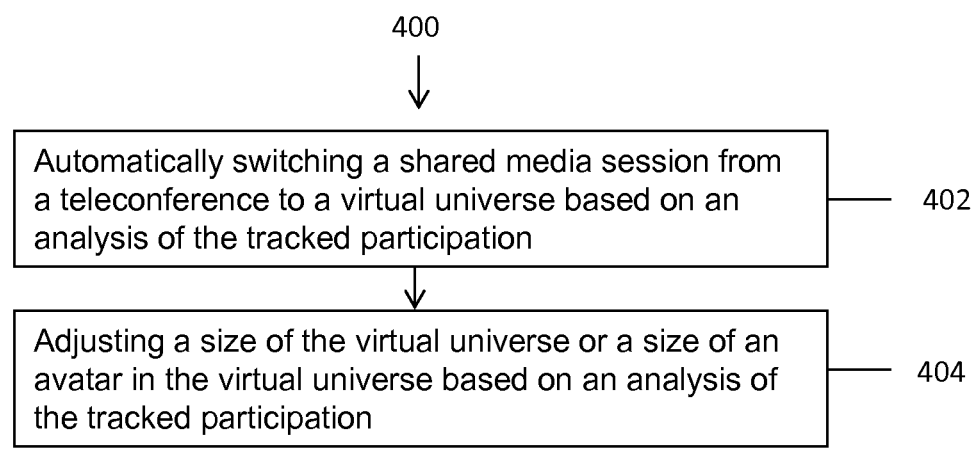
FIG. 4 shows a shared media session that includes a virtual universe according to one embodiment of the invention.

FIG. 4 shows a shared media session that includes a virtual universe in accordance with an embodiment of the invention. The method of FIG. 4 may be implemented in connection with the method steps of FIG. 1.

The method of FIG. 4 includes a switching step 402. At switching step 402, a shared media session is automatically switched from a teleconference to a virtual universe based on an analysis of the tracked participation. For example, if an analysis of the tracked participation determines that the participants of the shared media session require a forum to hold multiple conversations concurrently, the shared media session may be switched to a virtual universe in order to allow multiple conversations. In an embodiment, participation is tracked for a number of the participants and analysis of the tracked participation for all these participants leads to such a determination. After switching step 402 is completed, the method continues to adjusting step 404.

At adjusting step 404, a size of the virtual universe or a size of an avatar in the virtual universe is adjusted based on an analysis of the tracked participation. In an embodiment, such an adjustment can be made separate from step 402. For example, if switching step 402 does not occur, for instance, if the shared media session began in a virtual universe and thus did not require a switch, the method may implement adjusting step 404. In an embodiment, participation is tracked for a number of the participants and analysis of the tracked participation for all these participants leads to such an adjustment.

Figure 5:
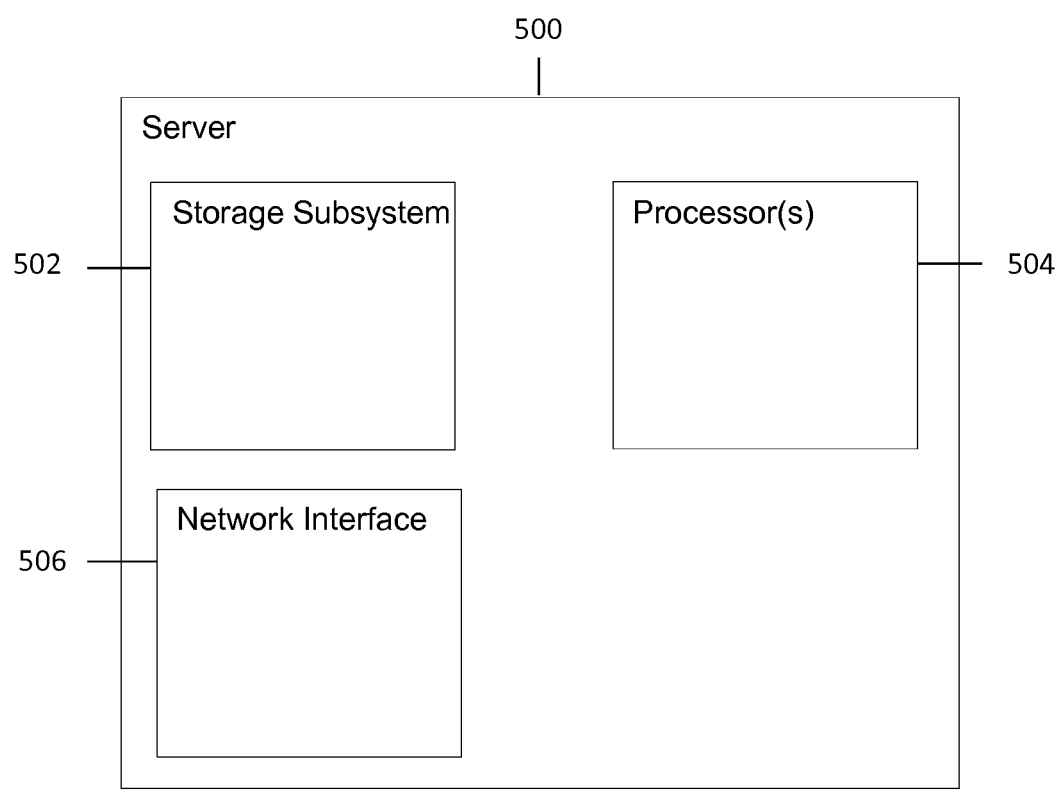
FIG. 5 shows a server for tracking participation in a shared media session according to one embodiment of the present invention.

FIG. 5 shows a server for tracking participation in a shared media session according to one embodiment of the present invention. For example, server 500 of FIG. 5 may be used to implement the method steps of FIGS. 1-4. Server 500 includes storage subsystem 502, computer processor(s) 504, and network interface 506.

Storage subsystem 502 included in server 500 may comprise of a hard disk, a random access memory (RAM), a read-only memory (ROM), an erasable programmable read-only memory (EPROM or Flash memory), or any other suitable storage device or combinations thereof. Processor(s) 504 included in server 500 may comprise of one or more computer processors.

Figure 6:
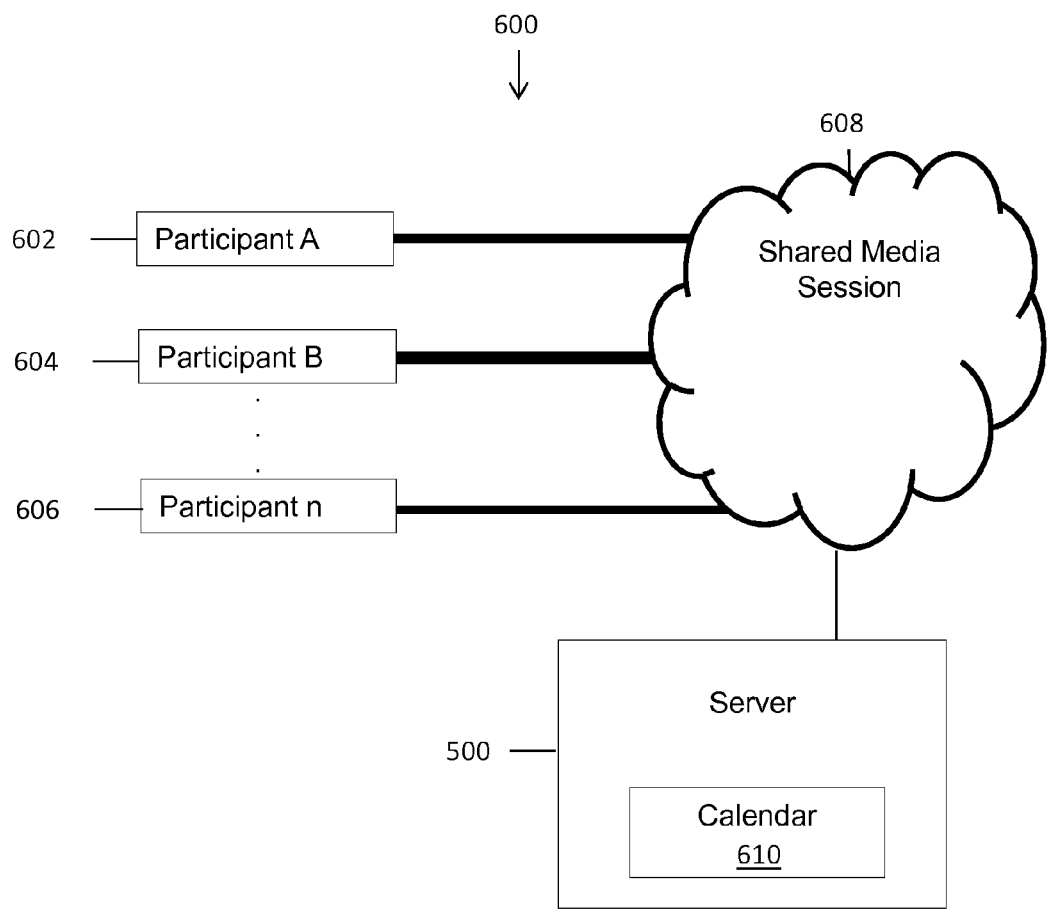
FIG. 6 shows a system for tracking participation in a shared media session according to one embodiment of the present invention.

FIG. 6 shows a system for tracking participation in a shared media session according to one embodiment of the present invention. FIG. 6 includes participant A 602, participant B 604, participant n 606, and shared media session 608. In one embodiment, the server 500 includes an electronic calendar 610 for displaying the amount of active participation provided by each of the shared media session participants. This allows users to review a calendar entry to understand participant information for a meeting. As used herein, an electric calendar is calendaring software that includes capability to plan meetings. The electronic calendar may be local to a user's computer or hosted on a server 500 and shared by many users.

In a particular embodiment, the shared media session participants are meeting attendees listed for the shared media session on the electronic calendar 610. The displayed participation information may be, for example, a listing of the actual minutes each of attendees spoke during the meeting or a graphical representation, such as a bar graph.

Figure 7:
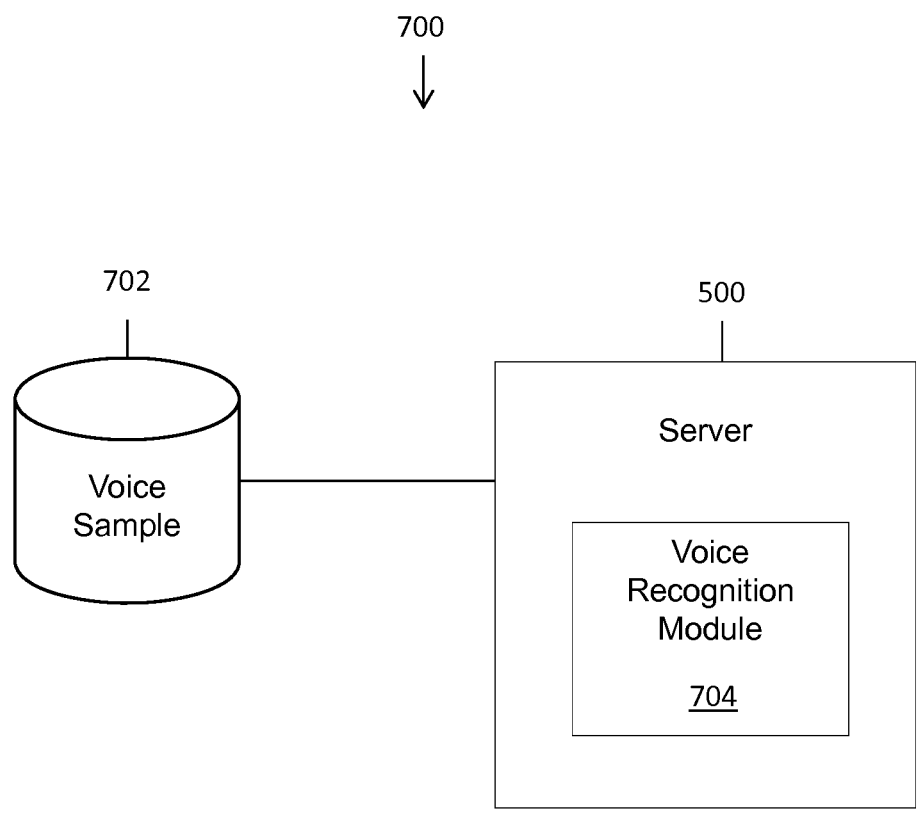
FIG. 7 shows a voice sample database according to one embodiment of the present invention.

FIG. 7 shows a voice sample database in accordance with an embodiment of the present invention. FIG. 7 includes voice sample database 702. In one embodiment of the invention, a voice recognition module 704 uses the electric calendar's attendee list of a calendar entry for the shared media session to enhance the accuracy of the voice recognition. For example, the voice recognition module 704 may restrict the voice samples stored in the database 702 to only stored voices of individuals whose names appear as attendees of electronic meeting on the electronic calendar to determine an individual identification.

Figure 8:
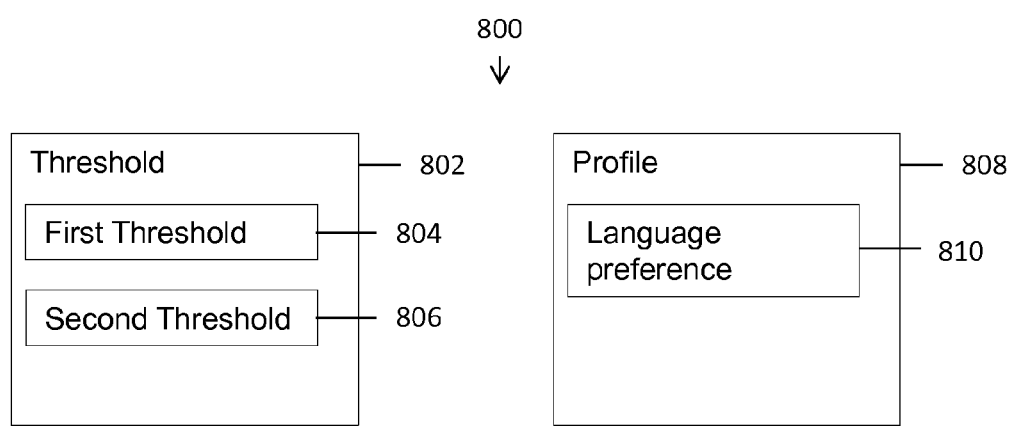
FIG. 8 shows data structures used with the system according to one embodiment of the present invention.
Figure 9:
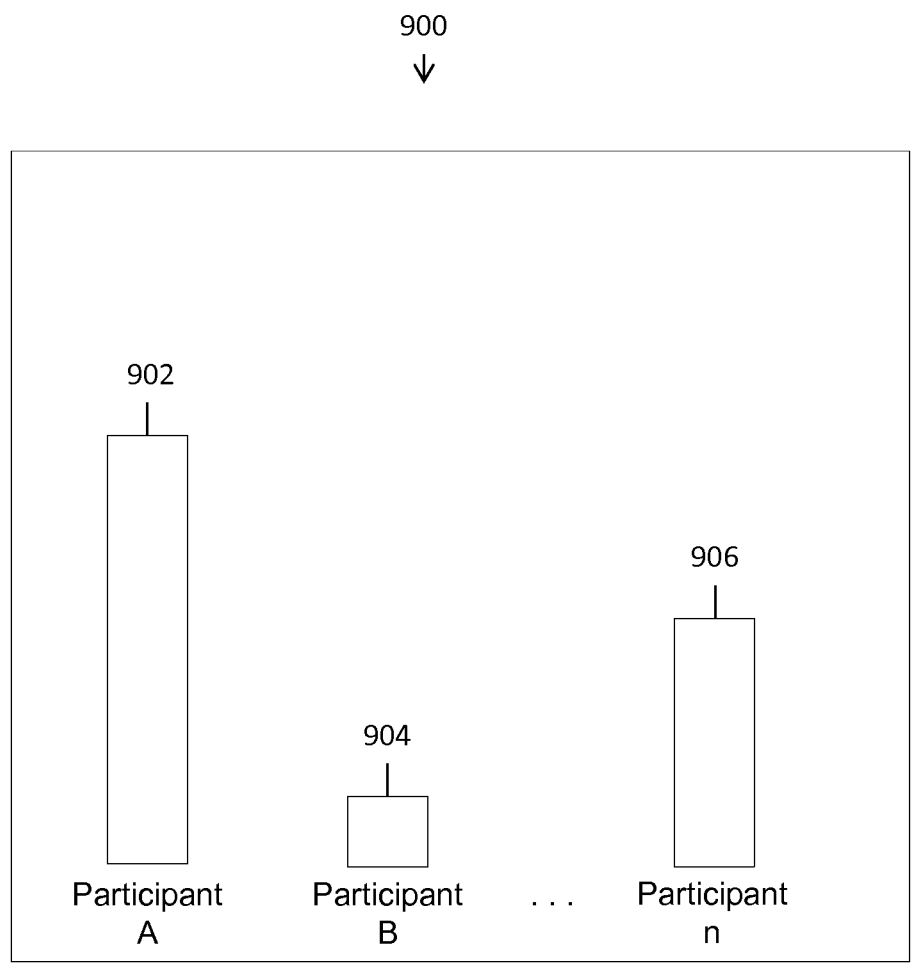
FIG. 9 shows a display according to one embodiment of the present invention.

FIG. 8 shows data structures in accordance with an embodiment of the invention. FIG. 8 includes threshold data 802, first threshold 804, second threshold 806, profile 808, and language preference 810. FIG. 9 shows a display in accordance with an embodiment of the invention. FIG. 9 includes bars 902, 904, and 906.

In an embodiment, server 500 connects to shared media session 608, where shared media session 608 includes participant A 602, participant B 604, and participant n 606. By way of example, shared media session 608 may comprise a teleconference, a video meeting, a session in a virtual universe, or any other suitable shared media session. In an example, participant A 602, Participant B 604, and Participant n 606 connect with shared media session 608 using a telephone, a computer that enables the user to project an avatar in a virtual universe, a computer than enables a user to participant in a video meeting, or with any other suitable means.

In an embodiment, server 500 then determines a first identity for a first participant, the first identity being determined with a first confidence level. For example, a first identity is determined for participant A 602 with a first confidence level.

In an embodiment, server 500 determines a first identity for participant A 602 with a first confidence level by accessing voice sample database 702. By way of example, voice sample database 702 stores voice samples for participants of shared media session 608 and each stored voice sample is associated with an identity. For instance, voice sample database 702 stores voice samples for participant A 602, participant B 604, and participant n 606 and accordingly stores the identity of each participant with the voice sample.

In an embodiment, server 500 monitors the voice of participant A 602 and compares the monitored voice to the voice samples stored in voice sample database 702. Server 500 then determines an identity for participant A 602 based on the comparison.

In an embodiment, server 500 determines a first identity for participant A 602 with a first confidence level by accessing an attendee list for shared media session 608. Server 500 accesses an attendee list that includes the identities for the participants of shared media session 608 and determines an identity for participant A 602 based on the attendee list.

In an embodiment, server 500 then identifies the first participant as the first identity if the first confidence level is above first threshold 804. Server 500 then tracks an amount of participation by the first identity. For instance, server 500 tracks the level of participation by identified participant A 602. In an example, tracking the participation of participant A 602 comprises tracking an amount that participant A 602 speaks during a teleconference, video meeting, or virtual universe session. In an embodiment, based on the tracked participation, server 500 modifies an attendee list for a future shared media session.

In an embodiment, server 500 then displays the amount of participation by the first identity to the plurality of participants. For example, server 500 displays the tracked amount of participation for identified participant A 602 to participant A 602, participant B 604, and participant n 606. In an embodiment, the participation is tracked and displayed in real-time (i.e., during the shared media session).

By way of example, the display of the tracked amount of participation by the participants is depicted in FIG. 9. In an embodiment, the system tracks the participation for each of the plurality of participants of a shared media session. For instance, server 500 tracks the participation of participant A 602, participant B 604, and participant n 606. FIG. 9 depicts a bar graph that shows the amount each participant has participated in shared media session 608. For example, bar 902 depicts the participation for participant A 602, bar 904 depicts the participation for participant B 604, and bar 906 depicts the participation for participant n 606.

In an embodiment, server 500 translates information from the shared media session based on a profile for a participant.

For example, a profile 808 is associated with each of the participants of a shared media session and profile 808 includes language preference 810. Language preference 810 describes the language preferences for the participant associated with the profile. For example, server 500 translates information from shared media session 608 for identified participant A 602 based on language preference 810 in a profile 808 associated with identified participant A 602. In an embodiment, a translation comprises translating information from a first language to a second language. By way of example, the information translated comprises speech spoken during a shared media session, information displayed on a shared screen, such as a presentation displayed to multiple participants over a WebEx session, or any other information in a first language presented in a shared media session.

In an embodiment, the translation is suggested based on a low level of participation from a participant. For example, translation is suggested to participant A 602 if the participant is below a certain amount of participation. In an embodiment, server 500 prompts participant A 602 to speak if the tracked participation from participant A 602 is below second threshold 806.

Figure 10:
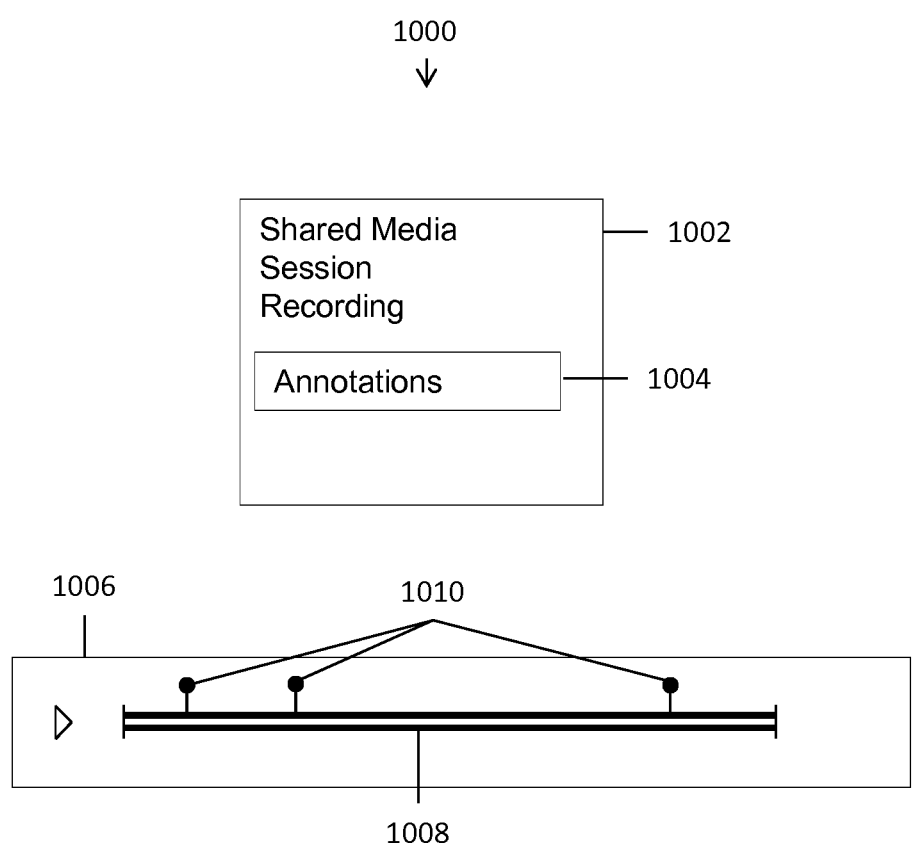
FIG. 10 shows storage and playback for a shared media session according to one embodiment of the present invention.

FIG. 10 depicts storage and playback for a shared media session in accordance with an embodiment of the invention. In an embodiment, server 500 records shared media session 608 and stores the recording. For instance, server 500 stores recorded shared media session 608 as shared media session 1002. In an embodiment, server 500 annotates the stored recording 1002 based on the tracked participation of participant A 602. For example, the annotations comprise times during the shared media session when participant A 602 was participating, such as times when participant A 602 was speaking.

In an embodiment, server 500 enables playback of recording 1002 such that a user may skip to portions of shared media session 608 where the identified participant A 602 was speaking. For example, player 1006 comprises an audio player that can playback a recorded teleconference. In an embodiment, shared media session 608 comprises a teleconference and player 1006 plays back recording 1002. By way of example, play back bar 1008 shows the time in recording 1002 player 1006 is playing. In an embodiment, annotations 1010 depicted in FIG. 10 show times during shared media session 608 when participant A 602 was speaking. During playback, a user may select one of the annotations 1010 to skip to that portion of recording 1002.

Figure 11:
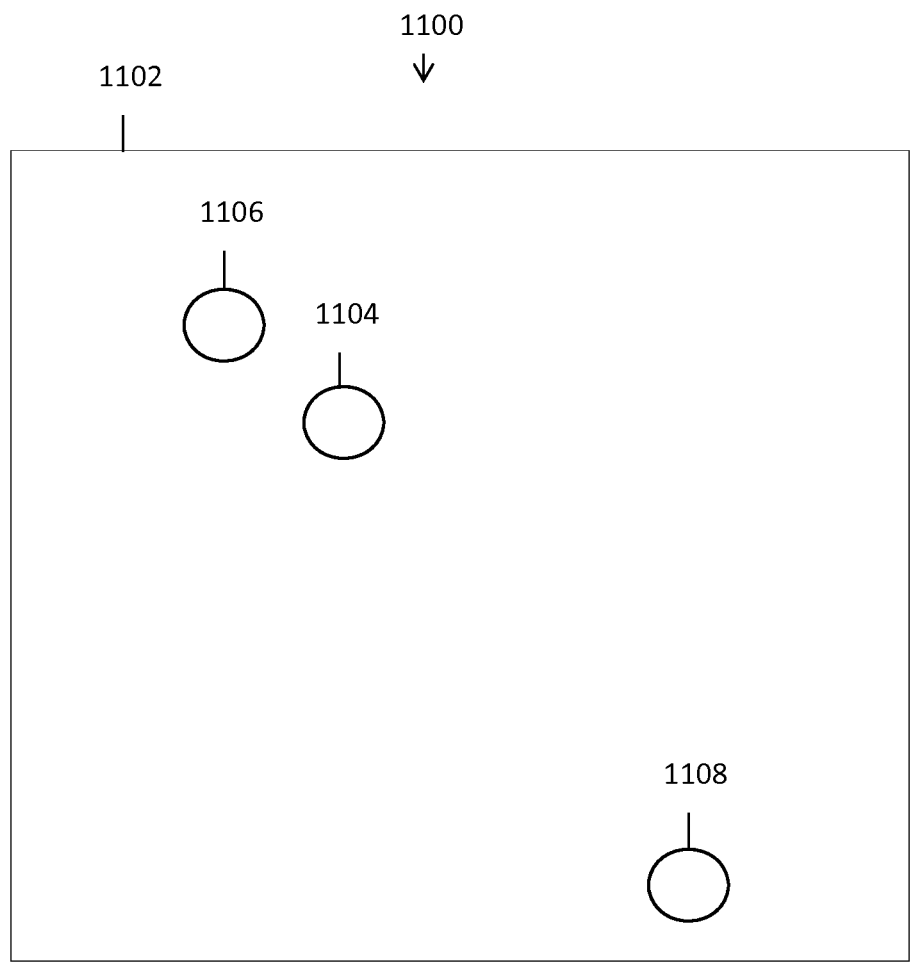
FIG. 11 shows a virtual universe shared media session including avatars according to one embodiment of the present invention.
Figure 12:
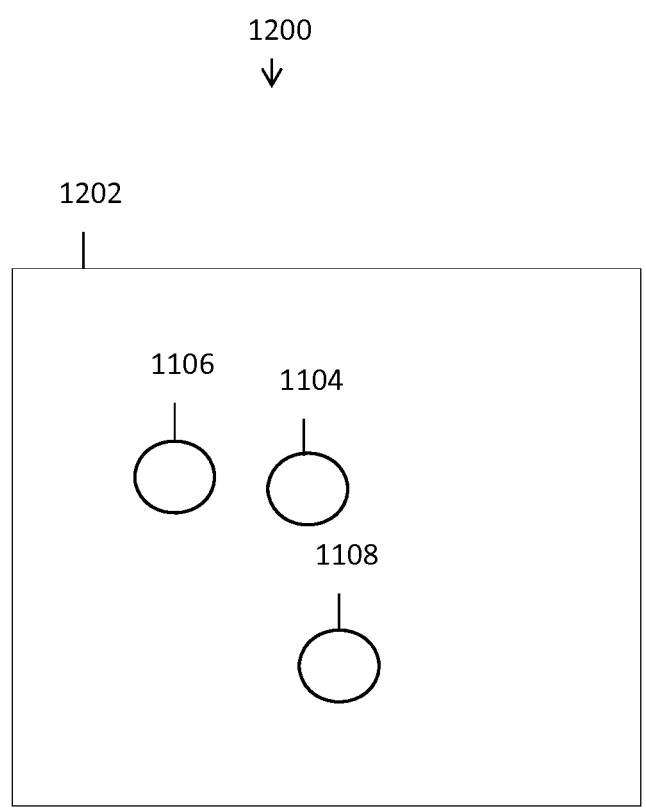
FIG. 12 shows a virtual universe shared media session with a reduced size according to one embodiment of the present invention.
Figure 13:
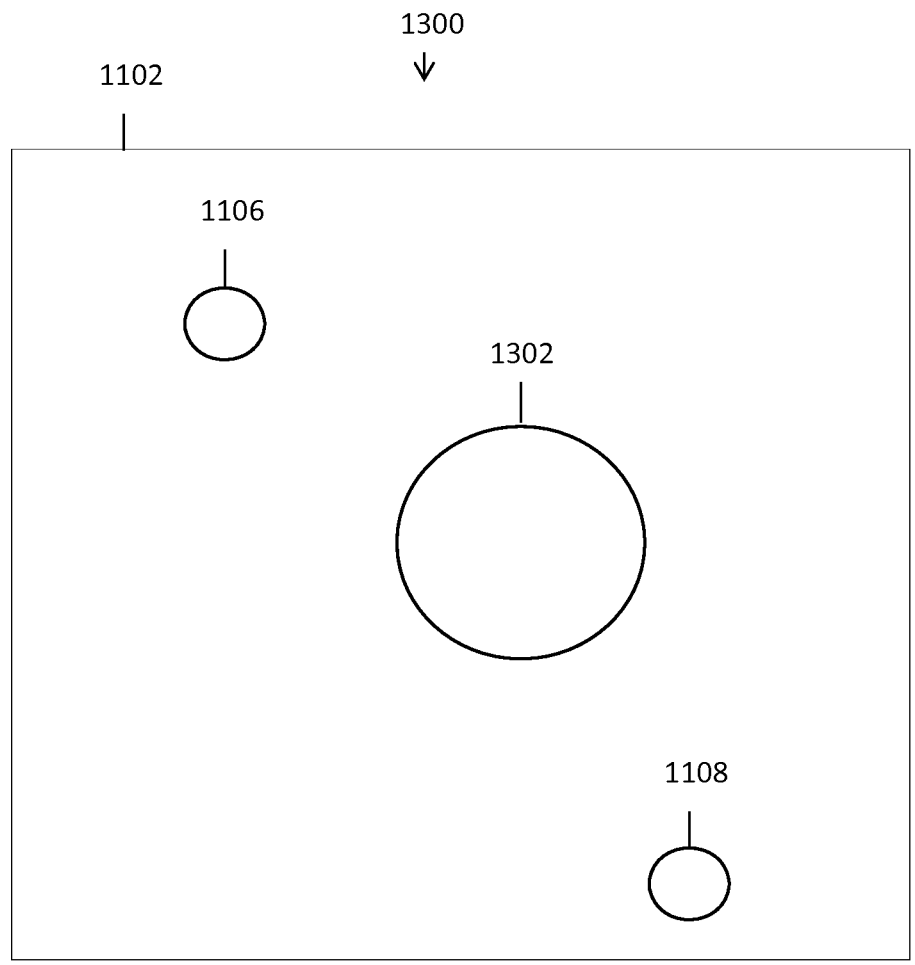
FIG. 13 shows a virtual universe shared media session with an avatar with an increased size according to one embodiment of the present invention.

FIGS. 11-13 depict a virtual universe shared media session in accordance with an embodiment of the invention. In an embodiment, server 500 automatically switches shared media session 608 from a teleconference to a virtual universe based on an analysis of tracked participation. For example, shared media session 608 starts as a teleconference, and server 500 switches shared media session 608 from a teleconference to a virtual universe based on tracked participation for the participants.

In an embodiment, server 500 tracks the participation for all the participants of the shared media session. For example, server 500 tracks the participation for participant A 602, participant B 604, and participant n 606. The automatic switch from a teleconference to a virtual universe may be triggered based on the analysis of the tracked participation for all of the participants.

In an embodiment, a virtual universe shared media session comprises a virtual space that simulates a physical space, for instance a virtual meeting room that simulates a physical meeting room. In an example, the virtual universe also includes avatars that represent participants of the shared media session. For instance, shared media session 608 takes place in the virtual universe 1102. Additionally, avatar 1104 represents participant A 602, avatar 1106 represents participant B 604, and avatar 1108 represents participant n 606.

In an embodiment, server 500 adjusts the size of the virtual universe based on tracked participation for the participants of the shared media session. For example, virtual universe 1102 comprises a virtual meeting room, and server 500 reduces the size of virtual universe 1102, as depicted by virtual universe 1202, based on the tracked participation for the participants.

In an embodiment, server 500 adjusts the size of an avatar in the virtual universe based on tracked participation for the participants of the shared media session. For example, virtual universe 1102 comprises of a virtual meeting room that contains avatar 1104, avatar 1106, and avatar 1108. In an embodiment, server 500 grows the size of avatar 1104, as depicted by avatar 1302, based on the tracked participation for the participants.

In an embodiment, system 500 tracks the participation for all the participants of the shared media session. For example, server 500 tracks the participation for participant A 602, participant B 604, and participant n 606. The size adjustment of the virtual universe of an avatar may be triggered based on the analysis of the tracked participation for all of the participants.

In an embodiment, the server 500 of FIG. 5 the systems of FIGS. 6-13 are used in combination. By way of example, the figures may be used in any configuration suitable to operate the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for tracking participation in a shared media session, the system comprising:
    a computer including a computer processor, the computer configured to:
    convert speech waveforms into voice samples;
    store the voice samples in a database;
    access an attendee list, in an electronic calendar, for the shared media session;
    connect to a shared media session, the shared media session including a plurality of participants;
    monitor voices of the participants during the shared media session;
    compare the monitored voices to only the voice samples stored in the database of attendees listed in the attendee list;
    determine a first identity for a first participant based on the monitored voices compared with the voice samples of attendees listed in the attendee list, the first identity being determined with a first confidence level;
    identify the first participant as the first identity if the first confidence level is above a first threshold;
    track an amount of participation by the first identity; and
    display on an electronic calendar for the shared media session the amount of participation by the first identity to the plurality of participants.

2. The system of claim 1, wherein determining the first identity for the first participant further comprises accessing an attendee list for the shared media session in the electronic calendar and determining the first identity based on the accessed attendee list.

3. The system of claim 1, wherein the displayed amount of participation is updated in real-time.

4. The system of claim 1, wherein an attendee list for a future shared media session is modified based on the tracked amount of participation.

5. The system of claim 1, wherein the server is further configured to:
    translate information from the shared media session from a first language to a second language based on a profile associated with the first identity; and
    wherein the profile includes language preferences for the first identity.

6. The system of claim 1, wherein the server is further configured to:

prompt the first participant to speak if the tracked amount of participation is below a second threshold.

7. The system of claim 1, wherein the server is further configured to:
- record the shared media session and storing the recording;
- annotate the recorded shared media session based on the tracked participation; and
- enable playback of the recorded shared media session such that a user may skip to portions of the shared media session where the first identity was speaking.

8. The system of claim 1, further comprising automatically switching the shared media session from a teleconference to a virtual universe based on an analysis of the tracked participation.

9. The system of claim 1,
- wherein the shared media session comprise a virtual universe and the plurality of participants are represented by a plurality of avatars in the virtual universe; and
- wherein one or more of a size of the virtual universe and a size of an avatar in the virtual universe is adjusted based on the tracked participation.

10. A computer program product for tracking participation in a shared media session, the computer program product comprising:
- a non-transitory computer readable storage medium having computer readable program code embodied therewith, the computer readable program code configured to:
- convert speech waveforms into voice samples;
- store the voice samples in a database;
- access an attendee list, in an electronic calendar, for the shared media session;
- connect to a shared media session, the shared media session including a plurality of participants;
- monitor voices of the participants during the shared media session;
- compare the monitored voices to only the voice samples stored in the database of attendees listed in the attendee list;
- connect to a shared media session, the shared media session including a plurality of participants;
- determine a first identity for a first participant based on the monitored voices compared with the voice samples of attendees listed in the attendee list, the first identity being determined with a first confidence level;
- identify the first participant as the first identity if the first confidence level is above a first threshold;
- track an amount of participation by the first identity; and
- display on an electronic calendar for the shared media session the amount of participation by the first identity to the plurality of participants.

11. A computer program product as in claim 10, wherein the computer readable program code to determine the first identity for the first participant further comprises the computer readable program code to access an attendee list for the shared media session in the electronic calendar and determine the first identity based on the accessed attendee list.

12. The computer program product of claim 10, wherein the displayed amount of participation is updated in real-time.

13. The computer program product of claim 10, wherein an attendee list for a future shared media session is modified based on the tracked amount of participation.

14. The computer program product of claim 10, further comprising computer readable program code to:
- translate information from the shared media session from a first language to a second language based on a profile associated with the first identity; and
- wherein the profile includes language preferences for the first identity.

15. The computer program product of claim 10, further comprising computer readable program code to prompt the first participant to speak if the tracked amount of participation is below a second threshold.

16. The computer program product of claim 10, further comprising computer readable program code to:
- record the shared media session and storing the recording;
- annotate the recorded shared media session based on the tracked participation; and
- enable playback of the recorded shared media session such that a user may skip to portions of the shared media session where the first identity was speaking.

17. The computer program product of claim 10, further comprising computer readable program code to automatically switch the shared media session from a teleconference to a virtual universe based on an analysis of the tracked participation.

18. The computer program product of claim 10,
- wherein the shared media session comprise a virtual universe and the plurality of participants are represented by a plurality of avatars in the virtual universe; and
- wherein one or more of a size of the virtual universe and a size of an avatar in the virtual universe is adjusted based on the tracked participation.

\* \* \* \* \*